Patented June 9, 1942

2,285,419

UNITED STATES PATENT OFFICE 2,285,419

ALIPHATIC AMINES

Joseph B. Dickey, Rochester, N. Y., and Arzy R. Gray, Kingsport, Tenn., assignors to Eastman Kodak Company, Rochester, N. Y., a corporation of New Jersey No Drawing. Application March 22, 1939, Serial No. 263,525

11 Claims. (Cl. 260—584)

This invention relates to the manufacture of alkoxy alkyl amines and in particular to those alkoxy alkyl amines having at least two oxygen atoms in the amine molecule.

Aliphatic amines have a number of uses in industry. Various methods have been suggested for the manufacture of both aromatic and aliphatic amines. For example, it has been suggested to react alcohols and ammonia under pressure at temperatures of 400–500° C. in the presence of a certain catalyst. However, when such procedure is applied to the manufacture of alkoxy amines of our invention, a number of difficulties arise. Reaction takes place with extreme vigor and the autoclave fills with a large amount of useless gases, and no alkoxy amines are isolatable.

We have found that under certain controlled reaction conditions new aliphatic amines having at least one ether linkage in their molecule may be prepared. Although it has been suggested in the prior art that ammonia attacks the ether linkages, we have found that by our reaction, amination may be carried out wherein the ether linkages remain intact and the amination may be caused to proceed in the desired direction of obtaining alkoxy amines.

This invention has for an object to provide a method for the manufacture of alkoxy alkyl amines. Another object is to provide a catalytic method for the manufacture of alkoxy amines wherein decomposition thereof is minimized. Another object is to provide a method for the manufacture of amines having the formula:

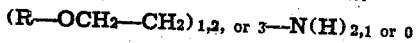

Another object is to provide a method of manufacturing alkoxy alkyl amines having at least two oxygen atoms in the molecule. Still another object is to provide a method of manufacturing alkoxy amines wherein a variety of catalyst may be employed for improving the reaction. Other objects will appear hereinafter.

A better understanding of our invention may be had from the following examples. It is understood that these examples are set forth primarily for illustrating a variety of embodiments of our invention, certain of the examples being for illustration of the preferred embodiment of alkoxy amines having a plurality of oxygen atoms in the molecule.

We have found that mono- di- and tri-β-methoxy or ethoxy ethyl amines can be prepared by heating the proper glycol ether with ammonia either in the liquid or vapor state, as the particular compound may indicate, and using a suitable catalyst. In general, we may employ any hydrogenation, dehydrogenation or dehydration catalyst, among which may be mentioned nickel from a nickel alloy, other forms of nickel, copper, alumina, silica gel, copper-chromite, zinc-copper-chromite and the like.

The relative amounts of each of these amines formed vary in both the liquid and vapor state with the molecular ratio of the glycol ether to the ammonia, the temperature and time of contact with the catalyst. We have found that if for a given charge a larger yield of di- and tri-amines is desired, the amount of ammonia is reduced and time of contact with the catalyst may be increased, as may be the temperature. In the vapor phase the yield of amines is increased for any given set of conditions by repassing the reactants through the reaction vessels and by changing the relative concentration of the reactants and the time and temperature as above indicated. We have also found that we may mix the glycol ether with primary or secondary amines to give di- and tri-amines.

The reaction may be carried out at temperatures generally ranging between 160–350° C. although for optimum results we have found that in many instances the temperature preferably should be maintained within 200–250° C., as will be apparent from certain of the examples set forth. Reaction in the liquid phase may be carried out under some pressure in a closed vessel equipped for shaking or stirring.

When amination is carried out in the vapor phase the products of reaction are condensed, passed through a suitable still and then the glycol ether recovered may be mixed with ammonia (or other amination agent such as primary and secondary amines) and returned to the reaction vessel. Or, if desired, di- and tri-ethoxy or methoxy ethyl amine may be added to the reaction mixture during the preparation of amines for decreasing the tendency to form the poly amines.

For catalysts we may use finely divided metallic oxides, reduced metals, silicates, phosphates such as phosphoric acid on pumice, fuller's earth, pumice, activated charcoal and nickel from an alloy. By this type of nickel catalyst we refer to one wherein an alloy of nickel such as nickel aluminum or nickel silicon is treated with an alkali hydroxide or other solvent for the aluminum and/or silicon, thereby giving a finely divided nickel. Or, nickel or kieselguhr, copper, copper-chromite, copper-zinc-chromium oxide, thorium oxide, magnesium oxide, molybdenum oxide, osmium oxide and others may be employed.

The invention will be further illustrated by the following examples:

*Example I*

228 gm. ethylene glycol monomethyl ether, 105 gm. ammonia and 10 gm. nickel from a nickel alloy as described above are heated in a shaking autoclave at 200° C. for 15 hours and for 9 hours at 220–240° C. The bomb is cooled and the reaction products are removed and fractionated. There is obtained a 17% yield of β-methoxyethylamine boiling at 92–94°. Practically no decomposition products were obtained and the unused glycol-ether was recovered.

*Example II*

228 gm. ethylene glycol monomethyl ether, 110 gm. ammonia and 9 gm. nickel as aforementioned were heated in a shaking autoclave for 48 hours at 200° C. There was obtained a 23% yield of β-methoxyethylamine.

*Example III*

228 gm. ethylene glycol monomethyl ether, 146 gm. ammonia and 8 gm. nickel as aforementioned were heated in a shaking autoclave at 240° for 72 hours. The reaction products were fractionated to give 32% β-methoxyethylamine, 11% di-β-methoxyethylamine, boiling point 170–174°/760 mm. and 7% tri-β-methoxyethylamine, boiling point 235°/760 mm.

*Example IV*

228 gm. ethylene glycol monomethyl ether, 120 gm. ammonia and 10 gm. nickel on kieselguhr (prepared in accordance with J. Amer. Chem. Soc. 54, 1661—1932) were heated in a stationary autoclave fitted with an efficient stirring apparatus at 200–250° for 20 hours to give a good yield of the primary amine.

*Example V*

270 gm. ethylene glycol monoethyl ether, 6 gm. nickel as aforementioned and 110 gm. ammonia are heated in a shaking autoclave for 24 hours. There is obtained a 17% yield of β-ethethylamine, boiling point 104–109°/740 mm.

*Example VI*

270 gm. ethylene glycol monoethyl ether, 10 gm. copper chromite (prepared by a method similar to that shown in J. Amer. Chem. Soc. 53, 1091—1931) and 120 gm. ammonia are heated in a shaking autoclave at 200° for 30 hours. There is obtained a good yield of β-ethethylamine.

*Example VII*

An aluminum oxide catalyst is prepared as follows: 200 gm. aluminum nitrate are dissolved in 2 liters water and 200 gm. infusorial earth are added. Then ammonium hydroxide is added in slight excess. The product is washed well, dried at room temperature and pulverized.

The catalyst thus prepared is placed in a "Pyrex" tube heated to 200–250° and a mixture of ammonia (3 moles) and ethylene glycol monomethyl ether (1 mole) is passed through in the gaseous state. The reaction products may be condensed and repassed as often as desired. Good yields of mono-, di- and tri-β-methoxyethylamine are obtained, based on the glycol-ether used in the reaction.

*Example VIII*

An acid catalyst is prepared as follows: A dilute solution of ortho phosphoric acid containing 450 gm. of acid is sprayed on to 1000 cc. of finely divided pumice with stirring and the temperature held above the boiling point of the phosphoric acid water mixture.

Then a mixture of ethylene glycol monoethyl ether (1 mole) and ammonia (3 moles) are passed over the catalyst in a suitable reaction vessel heated to 200–240°. Good yields of the desired amines are obtained.

We have found that similar reaction to that already described may be applied to other compounds and alkoxy alkyl amines obtained. We have found that mono-, di and tri-alkoxy alkyl amines having the formula:

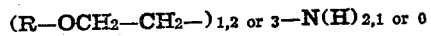

$$(R-OCH_2-CH_2-)_{1,2 \text{ or } 3}-N(H)_{2,1 \text{ or } 0}$$

where R is an alkyl group having more than 2 carbon atoms, can be prepared by heating the corresponding alkoxy hydroxy compound with ammonia either in the liquid or vapor state in the presence of a suitable catalyst. We may use any of the catalysts, dehydrogenation, hydrogenation or dehydration already described. As already pointed out, the relative amounts of each of the amines formed may be varied. That is, if larger yields of di and triamines are desired, the amount of ammonia may be reduced, the temperature increased and the time of the contact with the catalyst increased.

If desired, primary and secondary amines may be added to the reaction. The reaction is preferably carried out below 300° C. and in equipment provided with means for shaking or stirring.

The invention may be further illustrated by the following examples:

*Example IX*

354 gm. β-butoxyethanol, 130 gm. ammonia and 10 gm. nickel, from a nickel alloy as described, are heated in a shaking autoclave at 235–240° for 24 hours. The bomb is cooled and the reaction products are fractionated. There is obtained a 33% yield of β-butoxyethylamine, boiling point 152–156°/750 mm. and 6% of di-β-butoxyethylamine, boiling point 264–270°/750 mm. Practically all of the unused β-butoxyethanol is recovered.

*Example X*

354 gm. β-butoxyethanol, 120 gm. ammonia and 10 gm. nickel on kieselguhr (J. Amer. Chem. Soc. 54, 661—1932) are heated in a stationary autoclave with sleeve stirrer for 24 hours at 200–230°. There is obtained a 23% yield of β-butoxyethylamine.

*Example XI*

354 gm. β-butoxyethanol, 100 gm. ammonia, 5 gm. nickel from an alloy as aforementioned, and 5 gm. copper-chromium-zinc oxide catalyst are heated in a shaking autoclave at 200–240° for 24 hours. There is obtained a good yield of β-butoxyethylamine.

*Example XII*

An aluminum oxide catalyst is prepared as follows: 200 gm. aluminum nitrate are dissolved in 2 liters of water and 200 gm. infusorial earth are added. Then ammonium hydroxide is added in slight excess. The product is washed well, dried at room temperature, and pulverized.

The catalyst thus prepared may be substituted for nickel, as aforementioned, in one of the above operations, or is placed in a "Pyrex" tube heated to 200–250° and a mixture of ammonia 3 and β-butoxyethanol is passed in in the gaseous state. The reaction product may be condensed and repassed as often as desired. Good yields of mono-, di- and tri-β-butoxyethylamine are obtained, based on the alcohol used in the reaction.

*Example XIII*

An acid catalyst is prepared as follows: A dilute solution of o-phosphoric acid containing 450 gm. of acid is sprayed on to 1000 cc. of finely divided pumice with stirring and the temperature held above the boiling point of the phosphoric acid water mixture. The catalyst thus prepared is placed in a suitable reaction vessel heated to 200–270° and a gaseous mixture of 1 mole of β-butoxyethanol to 3±moles of ammonia is passed over the catalyst. A good yield of the desired amines is obtained.

We have further found that by the proper reaction procedure, amination may be carried out to obtain new amines having two oxygen atoms in the molecule. If certain prior art procedure were employed in the attempted preparation of such compounds substantially total decomposition would result and only a mixture of gases would be obtained from the autoclave. We have found that mono-, di- and tri-β-alkoxy-β-ethoxy ethyl amine can be prepared by heating a glycol ether such as is commercially known as "Carbitol" with ammonia or other aminating agent such primary or secondary amines, either in the liquid or vapor state, in the presence of a dehydrogenation or hydrogenation or other catalyst as already described. Preferably we employ a nickel catalyst obtained from a nickel alloy as already pointed out. The preparation of these compounds containing at least two oxygen atoms in the molecule may be represented by the formula:

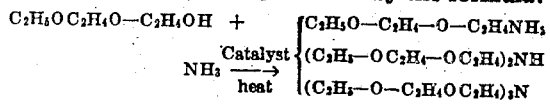

We have found that in this reaction the relative amounts of the primary, secondary and tertiary amines may be varied to some extent by controlling the molecular ratio of the glycol ether with respect to the ammonia, and controlling the temperature and the time of contact with the catalyst. That is, if for a given charge a larger yield of the di- and tri-amine is desired, the amount of ammonia is reduced and the time of contact with the catalyst may be increased as may be the temperature. In the vapor phase the yield of amines may be increased for any given set of conditions by repassing the reactants through the reaction vessel or vessels and by changing the relative concentration of the reactants and time and temperature as above. If desired, we may mix the amine of diethylene glycol ethyl ether and diamine of this compound with further diethylene glycol ethyl ether and repeat the reaction to give di- and tri-amines if desired.

The reaction may be carried out at temperatures ranging from between approximately 160–360° C. Preferably, the reaction is carried out in the liquid phase under some pressure and in closed vessels equipped for shaking and stirring.

When amination is carried out in the vapor phase the products of the reaction are condensed, passed through an efficient still and then the glycol ether recovered is mixed with ammonia and returned to the reaction vessel. If desired, di- and tri-amines of diethylene glycol ethyl ether may be added to the reaction mixture for decreasing the tendency to form poly amines and thereby obtaining large yields of primary amine.

For catalysts we may use any of the various materials already described in detail with respect to the previous examples.

Our invention will be further illustrated by the following examples:

*Example XIV*

268 gm. diethylene glycol ethyl ether, 48 gm. ammonia as a 28% aqueous solution and 10 gm. nickel from a nickel alloy are heated in a shaking autoclave at 180–185° for 20 hours. The reaction mixture is cooled and removed from the autoclave and heated at 170° for a short time to remove the ammonia. The mixture is then made acid to Congo with hydrochloric acid and the glycol-ether is removed under reduced pressure. The residue is then treated with a saturated sodium hydroxide solution and the amine that separates is removed with ether and dried. There is obtained a 20% yield of diethylene glycol ethyl ether amine boiling at 185–192°/760 mm. In addition to this there was a small amount of higher boiling basic material.

*Example XV*

268 gm. "carbitol," 12 gm. nickel from a nickel alloy and 96 gm. ammonia are heated at 200–205° for 40 hours and the reaction product is worked up as described above. There is obtained a 30% yield of carbitol amine, 6% of dicarbitol amine B. P. 130–135°/8 mm. and 2% tricarbitol amine, B. P. 165–69°/2 mm. In addition to this there were obtained several grams of a crystalline compound, tar and low boiling primary amine. Similar results can be obtained using a catalyst such as that prepared from nickel nitrate through the hydroxide, to the oxide and then reduced. This material may be supported on pumice or similar material.

*Example XVI*

133 gm. of secondary amine of diethylene glycol ethyl ether, 460 gm. diethylene glycol ethyl ether, and 12 gm. nickel from a nickel alloy are heated in an autoclave at 200–240° for 30 hours. The reaction products are fractionated to obtain a good yield of triamine of diethylene glycol ethyl ether and unchanged secondary amine.

*Example XVII*

An aluminum oxide catalyst is prepared as follows: 200 gm. of aluminum nitrate are dissolved in 2 l. water and 200 gm. infusorial earth are added. Then ammonium hydroxide is added in slight excess. The product is washed well, dried at room temperature, and pulverized.

The catalyst thus prepared is placed in a "Pyrex" tube heated to 250–300° and a mixture of ammonia (3 moles) and diethylene glycol ethyl ether (1 mole) is passed in in the gaseous state. Good yields of mono, di, and tri-amine of diethylene glycol ethyl ether are obtained based on the diethylene glycol ethyl ether used.

*Example XVIII*

Finely divided nickel oxide is made into a paste with colloidal silica and the paste is deposited on pumice granules.

20 gm. of the catalyst are mixed with 268 gm. of diethylene glycol ethyl ether and 70 gm. of ammonia and heated in a shaking autoclave at 220–230° for 36 hours. The reaction products are worked up as described in Example I. The yields of primary, secondary and tertiary amines are 37%, 20% and 9%, respectively.

The catalyst may be used to react diethylene glycol ethyl ether and ammonia in the gas phase.

As examples of further amines which can be prepared having at least two oxygen atoms in the molecule, reference is made to the following additional examples. We have found that mono-, di- and tri-tetrahydrofurfuryl-oxyethyl amine can be prepared by heating the corresponding tetrahydrofurfuryl-oxyethanol compound with ammonia in the presence of suitable catalyst. We may employ hydrogenation, dehydrogenation or dehydration catalysts, generically referred to as amination catalysts, as already described in detail in connection with the previous examples. Likewise, the relative amounts of the mono-, di- and triamines formed may be varied as already described by control of molecular ratios of the compound being treated, to the amination agent, the temperature, time of contact with the catalyst and the like. That is, as already described, if in a given charge a larger yield of the di, and tri-tetrahydrofurfuryl-oxyethyl amine is desired, the amount of the ammonia may be reduced and the temperature and time of contact with the catalyst increased. Likewise, the yield of the amines may be increased for any particular set of conditions by passing the reactants through the reaction apparatus or by altering the reaction conditions as described.

The preparation of these additional compounds may be represented by the formula:

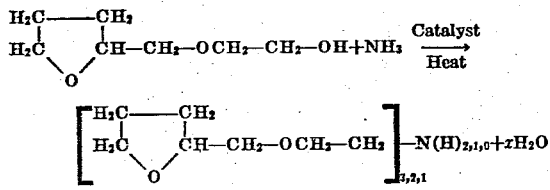

Preferably the temperatures employed would be between 160–350° C. and in many instances temperatures between 200–250° C. would be preferred. The reaction may be carried out under pressure in vessels equipped for agitation.

The resultant reaction product will be recovered by condensation, distillation, extraction, or in some other suitable manner. The unreacted furfuryl compound separated from the reaction product as indicated, may be returned to the reaction.

This embodiment of our invention is illustrated by the following examples:

Example XIX 440 gm. β-tetrahydrofurfuryloxyethanol 130 gm. ammonia and 10 gm. nickel from a nickel alloy were heated in a shaking autoclave at 210–220° for 40 hours. The reaction products were cooled and fractionated to give a 33% yield of β-tetrahydrofurfuryloxyethylamine, B. P. 162–164°/740 mm., 3% di-β-tetrahydrofurfuryloxyethylamine, B. P. 220–225°/19 mm. and a small amount of tri-β-tetrahydrofurfuryloxyethylamine, B. P. 274–279°/18 mm. Most of the furfuryl compound that did not react was recovered.

Example XX 440 gm. β-tetrahydrofurfuryloxyethanol, 120 gm. ammonia and 8 gm. nickel on kieselguhr (J. Amer. Chem. Soc. 54, 661—1932) were heated in an autoclave with vigorous stirring at 200–230° for 24 hours. There was obtained at 25% yield of the monoamine.

Example XXI 440 gm. β-tetrahydrofurfuryloxyethanol, 100 gm. ammonia, 5 gm. nickel from a nickel alloy and 5 gm. of a copper-chromium-zinc oxide catalyst were heated in a shaking autoclave at 200–250° for 24 hours. There was obtained a good yield of the monoamine.

Example XXII

An aluminum oxide catalyst was prepared as follows: 200 gm. aluminum nitrate was dissolved in 2 liters of water and 200 gm. infusorial earth was added. Then ammonium hydroxide was added in slight excess. The product was washed well, dried at room temperature and pulverized. The catalyst thus prepared may be substituted in the above operations or may be placed in a "Pyrex" tube heated to 200–275° and a mixture of ammonia (3 moles) and β-tetrahydrofurfuryl-oxyethanol (1 mole) passed through in the gaseous state. The reaction product may be condensed or may be repassed as often as desired. Good yields of the mono-, di- and tri-amine were obtained.

Example XXIII

An acid catalyst was prepared as follows: A dilute solution of o-phosphoric acid containing 450 gm. of acid was sprayed into 1000 cc. of finely divided pumice with stirring and the temperature held above the boiling point of the mixture. The catalyst thus prepared was placed in a suitable reaction vessel, heated to 200–270° and gaseous mixture of 1 mole of the alcohol to 3± (moles) of ammonia was passed over the catalyst. A good yield of the desired amine was obtained.

The various ether-amines obtained by our process may be used in place of ordinary aliphatic amines with superior results in many instances. One particularly useful field for the novel property of the present invention is in azo dye manufacture and processes of dyeing. Our ether-amines may be used as intermediates, couplers, and the like with very excellent results.

In the preferred operation of our process the reaction would be carried out at around 200° C. and preferably not materially greater than 250° C. As already indicated, conditions described in the prior art for the production of ordinary aliphatic amines would in many instances cause complete decomposition of alkoxy amines and thus be disadvantageous. Generically, we refer to the several catalysts aforementioned as amination catalysts.

It is apparent from the foregoing that we have provided certain novel alkoxy amines together with procedure for their manufacture. We do not wish to be restricted in our invention, excepting insofar as may be necessitated by the prior art and the spirit of the appended claims.

What we claim and desire to secure by Letters Patent of the United States is:

1. A process for preparing alkoxy amines, which comprises heating and reacting an ethylene glycol ether with ammonia at a temperature between about 125–300° C. in the presence of an amination catalyst.

2. A process for producing an alkoxy amine, which comprises heating an ethylene glycol ether and ammonia in the presence of a nickel catalyst obtained from a nickel alloy and at a temperature between about 200–250° C. for more than 10 hours, acidifying the resultant reaction mixture to produce the amine salt, removing any glycol ether remaining, treating the amine salt with an alkali to liberate the amine, extracting the liberated amine with a solvent therefor and recovering the amine from the solvent.

3. A process for preparing an alkoxy amine which comprises reacting ethylene glycol monomethyl ether and ammonia at a temperature of between 160–350° C. in the presence of an amination catalyst.

4. A process for preparing an alkoxy amine which comprises reacting ethylene glycol monomethyl ether and ammonia at a temperature of between 220–240° C. in the presence of an amination catalyst.

5. A process for preparing β-ethoxyethyl amine, which comprises reacting ethylene glycol monoethyl ether and ammonia at a temperature between 200–250° C. and in the presence of a hydrogenation catalyst.

6. The process which comprises reacting an ethylene glycol ether with an amination agent from the group consisting of ammonia and an amine producible by the herein described reaction, in the presence of a nickel hydrogenation catalyst.

7. The process which comprises reacting an ethylene glycol ether with ammonia in the presence of a hydrogenation catalyst.

8. In a process for the preparation of alkoxy amines by procedure including reacting an ethylene glycol ether with ammonia, the step which comprises including along with said ammonia a content of an alkoxy amine of the type being produced.

9. The process which comprises reacting a compound having the formula:

$$R\text{—}OCH_2CH_2OH$$

wherein R is a member from the group consisting of lower alkyl and lower alkoxy alkyl, with ammonia in the presence of an amination catalyst.

10. The process which comprises reacting a compound having the formula:

$$R\text{—}OCH_2CH_2OH$$

wherein R is a member from the group consisting of lower alkyl and lower alkoxy alkyl, with an amination agent in the presence of a hydrogenation catalyst.

11. The process which comprises reacting a compound having the formula:

$$R\text{—}OCH_2CH_2OH$$

wherein R is a member from the group consisting lower alkyl and lower alkoxy alkyl, with ammonia in the presence of an amination catalyst, and conducting the reaction at a temperature between 160° C. and 350° C.

JOSEPH B. DICKEY.
ARZY R. GRAY.

Certificate of Correction

Patent No. 2,285,419. June 9, 1942.

JOSEPH B. DICKEY ET AL.

It is hereby certified that error appears in the printed specification of the above numbered patent requiring correction as follows: page 2, first column, lines 48–49, for "β-ethethylamine" read *β-ethoxyethylamine*; and that the said Letters Patent should be read with this correction therein that the same may conform to the record of the case in the Patent Office.

Signed and sealed this 1st day of September, A. D. 1942.

[SEAL]

HENRY VAN ARSDALE,
*Acting Commissioner of Patents.*